Nov. 7, 1939.   H. J. McDEVITT   2,179,473
OILING DEVICE FOR FILTER UNITS
Filed May 5, 1938
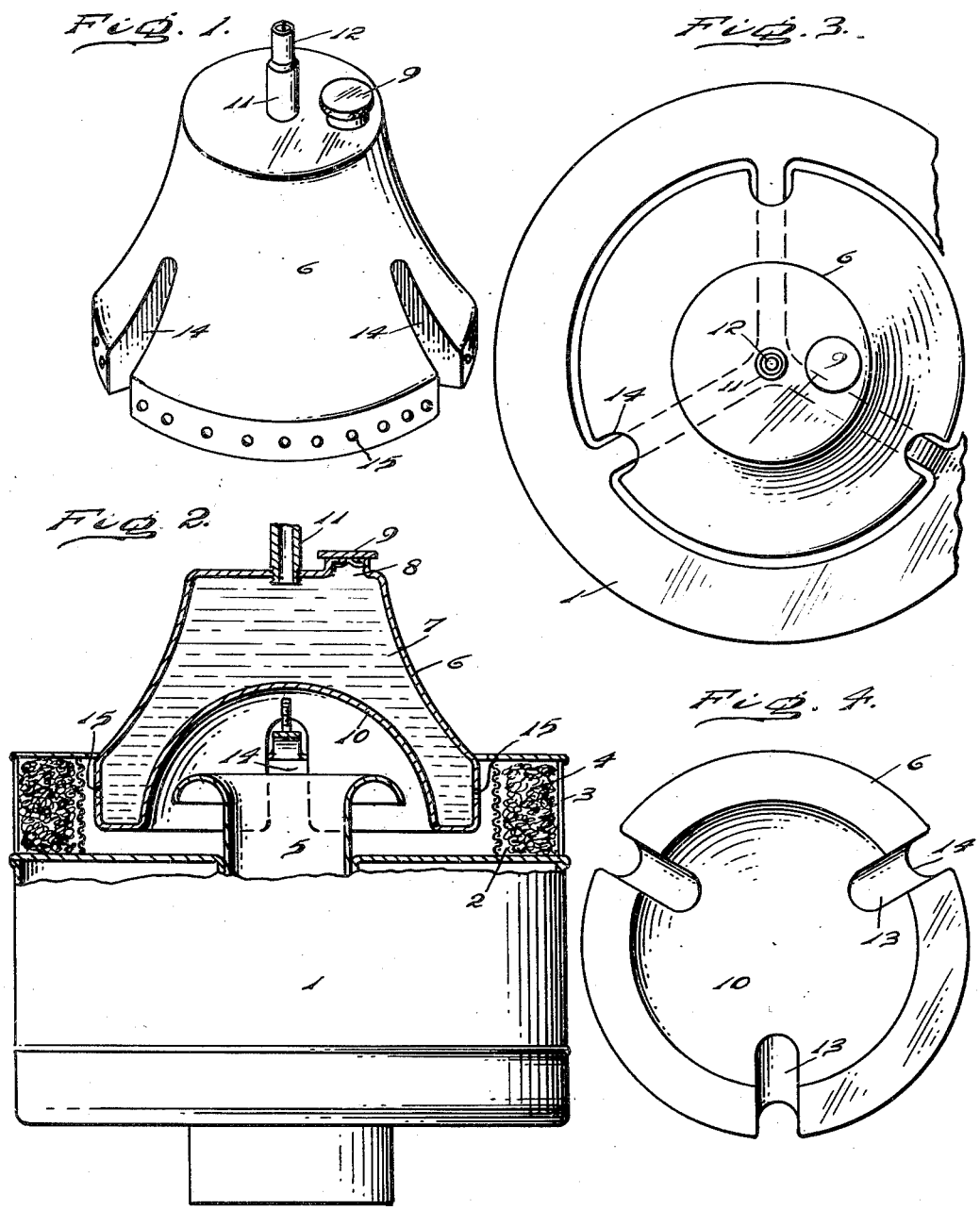
INVENTOR
Harry James McDevitt
BY
Herbert S. Fairbanks
ATTORNEY Patented Nov. 7, 1939

2,179,473

UNITED STATES PATENT OFFICE 2,179,473

OILING DEVICE FOR FILTER UNITS

Harry James McDevitt, Media, Pa., assignor to Gordon F. Milne, Rosemont, Pa.

Application May 5, 1938, Serial No. 206,310

3 Claims. (Cl. 91—44)

The object of this invention is to devise a novel oiling device for air filters.

After an air filter has been cleaned by circulating a cleaning fluid through it, it is advisable to apply oil to the filtering material through which the air passes in its path to the carburetor of the engine of a motor vehicle, and also to oil the conventional felt pad at the top of an air filter.

It is difficult to properly oil the filter unit with an oil can which is the conventional way of performing the oiling operation.

For this reason, I have devised novel means for applying the oil under a pressure feed so that the filtering material is uniformly oiled so that it will retain the maximum amount of dirt and foreign material which would otherwise pass to the carburetor and therefrom into the engine cylinders.

A further object of the invention is to devise a simple, compact and portable oiler which can quickly be applied to an air filter after the cleaning and drying operations have been effected.

With the above and other objects in view as will hereinafter clearly appear, my invention comprehends a novel oiling device for filter units.

Other novel features of construction and advantage will hereinafter more clearly appear in the detailed description and the appended claims.

For the purpose of illustrating the invention, I have shown in the accompanying drawing a typical embodiment of it, which, in practice, will give satisfactory and reliable results. It is, however, to be understood that the various instrumentalities of which my invention consists can be variously arranged and organized, and my invention is not limited to the exact arrangement and organization of these instrumentalities as herein set forth.

Figure 1 is a perspective view of an oiling device for filter unit, embodying my invention.

Figure 2 is a sectional elevation of the device in oiling position on a filter unit.

Figure 3 is a top plan view.

Figure 4 is a bottom plan view.

Similar numerals indicate corresponding parts.

Referring to the drawing:

1 designates an air filter unit of any desired or conventional character having a chamber 2 to receive filtering material 3 and air inlets 4 leading to a central air passage 5, baffled in any desired manner.

6 designates the casing of an oiling device embodying my invention. The casing has a chamber 7 provided with a controllable opening 8 through which oil is introduced into the chamber 7, said opening being normally closed by a plug 9. The casing is preferably bell shaped and has a closed bottom 10, which is curved and deflected to conform to the contour of the upper portion of a filter unit and to clear the ribs of the filter unit when its top cover is removed. A pipe 11 extends through the top of the casing, is connected with a source of compressed air supply, and is provided with a spring pressed valve 12, similar to a tire valve.

The conventional air filter and silencer has a central top opening with ribs extending to a closed central portion which carries a rod passing through the top felt pad and the cover, which latter is secured in place by a thumb nut. The filtering material, such as mineral wool is arranged in annular formation inwardly of the air intake ports which are circumferentially spaced around the upper wall of the filter unit.

The bottom 10 of the oiling device is deflected inwardly as at 13, and lower portions of the sides are deflected inwardly as at 14, to clear the three conventional ribs at the top of the filter unit. I thus in effect provide three sets of circumferentially spaced nozzles or ports 15 which discharge in proximity to the upper portion of the conventional annular screen which retains the mineral wool in position, and since these ports discharge the oil in a downward and outward path, the mineral wool is thoroughly and uniformly oiled.

The operation will now be apparent to those skilled in this art and is as follows:

The cover and felt pad are removed and the oiling device is inserted as shown in Figure 2. The oil is introduced into the oil receiving chamber and the fitting of a compressed air line applied to the valve 12, thus forcing the oil under pressure through the ports in the casing so that the ring of filtering material is thoroughly and uniformly oiled. The felt pad of the filter unit is then oiled and put in place, or the oiling device may be placed over it and such pad oiled by the oiling device if desired.

The casing is substantially bell shaped so that it is portable and can be readily grasped in the hand of the user. The sides of the casing flare outwardly and connect with a closed bottom conforming substantially to the shape of the upper end of the filter unit when the cover and felt pad are removed, and close the upper end of the filter unit.

The circumferentially spaced outlet ports preferably extend laterally so that the oil passes under pressure into the annular ring of filtering material which is usually a mass of non-oxidizable metal loosely arranged to have the incoming air for the filter pass through it.

It will be apparent from the foregoing, that the form of oiling mechanism herein disclosed is well adapted for the purpose of quickly and efficiently oiling the filtering material of filter units so that they may retain a maximum amount of impurities in the air passing through the filter unit and prevent them from passing into the engine cylinders.

Having thus described my invention, what I claim as new and desire to secure by Letters Patent is:

1. In an oiling device for filter units, a manually portable casing having an oil receiving chamber, having its bottom closed and deflected upwardly, and having a plurality of circumferentially spaced sets of circumferentially spaced ports at its lower end, and a conduit connectible with a source of fluid supply and discharging into said casing.

2. In an oiling device for filter units, a manually portable, bell shaped casing having an oil receiving chamber, having its bottom closed and inwardly and upwardly deflected, and having circumferentially spaced ports at its lower end, the upper end of said casing being closed and a conduit connectible with a source of fluid supply, and discharging into the upper end of said casing.

3. In an oiling device for filter units, a manually portable, bell shaped casing having an oil receiving chamber, having its bottom closed and inwardly and upwardly deflected, said casing having longitudinal extending, circumferentially spaced recesses in its bottom and side walls, said casing having a controllable filling opening communicating with said oil receiving chamber, and having circumferentially spaced ports at its lower end, and a conduit connectible with a source of fluid supply and discharging into said casing.

HARRY JAMES McDEVITT.